(12) United States Patent
Tabata

(10) Patent No.: US 11,354,911 B2
(45) Date of Patent: Jun. 7, 2022

(54) VEHICLE RECORDING CONTROL DEVICE, VEHICLE RECORDING DEVICE, VEHICLE RECORDING CONTROL METHOD, AND COMPUTER PROGRAM

(71) Applicant: JVCKENWOOD Corporation, Yokohama (JP)

(72) Inventor: Kiyofumi Tabata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 18 days.

(21) Appl. No.: 16/990,084

(22) Filed: Aug. 11, 2020

(65) Prior Publication Data

US 2020/0372261 A1 Nov. 26, 2020

Related U.S. Application Data

(63) Continuation of application No. PCT/JP2019/023080, filed on Jun. 11, 2019.

(30) Foreign Application Priority Data

Nov. 14, 2018 (JP) .............................. JP2018-213756

(51) Int. Cl.
*G06V 20/56* (2022.01)
*G06T 7/70* (2017.01)
*G06V 20/40* (2022.01)

(52) U.S. Cl.
CPC ................ *G06V 20/56* (2022.01); *G06T 7/70* (2017.01); *G06V 20/40* (2022.01); *G06T 2207/30264* (2013.01); *G06V 20/44* (2022.01)

(58) Field of Classification Search
CPC ..... G06K 2009/00738; G06K 9/00791; G06K 9/00711; G06T 2207/30264; G06T 7/70;
(Continued)

(56) References Cited

U.S. PATENT DOCUMENTS

2014/0300739 A1 10/2014 Mimar
2016/0096506 A1* 4/2016 Shreve ............... G06K 9/00771
348/148
(Continued)

FOREIGN PATENT DOCUMENTS

JP 2018-055630 4/2018
KR 2011-0015744 2/2011
(Continued)

OTHER PUBLICATIONS

International Search Report and Written Opinion for International Application No. PCT/JP2019/023080 dated Sep. 3, 2019, 8 pages.
(Continued)

*Primary Examiner* — Nizar N Sivji
(74) *Attorney, Agent, or Firm* — Amin, Turocy & Watson, LLP

(57) ABSTRACT

Provided are a video data acquisition unit that acquires video data captured by a camera; an event detection unit that detects an event occurring on a vehicle; a parking tendency determination unit that determines a tendency of a parking time at a parking position of the vehicle; and a recording function control unit that, when an event is detected while the vehicle is parked, controls a parking recording function for storing the video data captured by the camera.

8 Claims, 7 Drawing Sheets

(58) Field of Classification Search
CPC .......... G06T 2207/30244; G06T 2207/30248;
G07C 5/0866; H04N 7/18; H04N 5/77;
G08B 13/02
See application file for complete search history.

(56) References Cited

U.S. PATENT DOCUMENTS

| | | | |
|---|---|---|---|
| 2016/0152211 A1* | 6/2016 | Owens | B60R 25/31 |
| | | | 348/36 |
| 2016/0371983 A1* | 12/2016 | Ronning | G08G 1/09626 |
| 2018/0077378 A1* | 3/2018 | Satoh | H04N 5/23245 |
| 2018/0215344 A1* | 8/2018 | Santora | B60R 25/32 |
| 2018/0357484 A1* | 12/2018 | Omata | G06K 9/00818 |

FOREIGN PATENT DOCUMENTS

| | | |
|---|---|---|
| KR | 2015-0130717 | 11/2015 |
| WO | 2018/035403 | 2/2018 |
| WO | 2018/072541 | 4/2018 |

OTHER PUBLICATIONS

European Office Action for European Patent Application No. 19884326.0 dated Sep. 17, 2021.

* cited by examiner

VEHICLE RECORDING CONTROL DEVICE, VEHICLE RECORDING DEVICE, VEHICLE RECORDING CONTROL METHOD, AND COMPUTER PROGRAM

CROSS-REFERENCE TO RELATED APPLICATIONS

This application is a Continuation of PCT international application Ser. No. PCT/JP2019/023080 filed on Jun. 11, 2019 which designates the United States, incorporated herein by reference, and which claims the benefit of priority from Japanese Patent Application No. 2018-213756, filed on Nov. 14, 2018, incorporated herein by reference.

BACKGROUND

1. Technical Field

The present disclosure relates to a vehicle recording control device, a vehicle recording device, a vehicle recording control method, and a computer program.

2. Description of the Related Art

A vehicle recording device includes a parking recording function for recording an event that occurs while a vehicle is parked. In the technology, the parking recording function is operated by receiving a power supply from a built-in battery of the vehicle recording device or a battery of the vehicle. In the technology, the parking recording function can be operated for a long period of time by reducing the power consumption, by activating an event detection function while the vehicle is parked, and start recording after an event is detected.

When power is supplied from the built-in battery of the vehicle recording device or the battery of the vehicle, the operation time is limited by the remaining capacity of the battery. Moreover, when recording is started after the event is detected, video data at the time when the event is detected and before the event is detected will not be recorded. Consequently, it may become difficult to properly grasp the state when the event is detected, from the video data.

SUMMARY

It is an object of the present disclosure to at least partially solve the problems in the conventional technology.

To solve the above problem, and achieve the above object, a vehicle recording control device according to the preset disclosure, comprising: a video data acquisition unit that acquires video data captured by an image capturing unit for capturing an image of a surrounding of a vehicle; an event detection unit that detects an event occurring on the vehicle; a parking tendency determination unit that determines a tendency of a parking time at a parking position of the vehicle; and a recording function control unit that, when the event detection unit detects an event while the vehicle is parked, controls a parking recording function for storing the video data captured by the image capturing unit, wherein based on a determination result of the parking tendency determination unit, if the parking position of the vehicle is a place where the vehicle is to be parked for a relatively long period of time, the recording function control unit performs a first parking recording that causes the image capturing unit to start capturing an image upon detecting an event and that stores captured data of a first period, as event recorded data, and if the parking position of the vehicle is not a place where the vehicle is to be parked for a relatively long period of time, the recording function control unit performs a second parking recording that causes the image capturing unit to operate while the vehicle is parked, and upon detecting an event, that stores captured data of a second period before and after, and including a time when the event is detected, as event recorded data.

A vehicle recording device according to the present disclosure, comprising: the vehicle recording control device above; and at least one of an image capturing unit that captures an image of a surrounding of a vehicle, and a recording unit that stores video data.

A vehicle recording control method according to the present disclosure, comprising: a step of acquiring video data that acquires video data captured by an image capturing unit for capturing an image of a surrounding of a vehicle; a step of detecting event that detects an event occurring on the vehicle; a step of determining parking tendency that determines a tendency of a parking time at a parking position of the vehicle; and a step of controlling recording function that, when an event is detected at the step of detecting event while the vehicle is parked, controls a parking recording function for storing the video data captured by the image capturing unit, wherein based on a determination result at the step of determining parking tendency, if the parking position of the vehicle is a place where the vehicle is to be parked for a relatively long period of time, the step of controlling recording function performs a first parking recording that causes the image capturing unit to start capturing an image upon detecting an event and that stores captured data of a first period, as event recorded data, and if the parking position of the vehicle is not a place where the vehicle is to be parked for a relatively long period of time, the step of controlling recording function performs a second parking recording that causes the image capturing unit to operate while the vehicle is parked, and upon detecting an event, that stores captured data of a second period before and after, and including a time when the event is detected, as event recorded data.

A non-transitory computer readable recording medium storing therein a computer program according to the present disclosure that causes a computer operating as a vehicle recording control device to execute: a step of acquiring video data that acquires video data captured by an image capturing unit for capturing an image of a surrounding of a vehicle; a step of detecting event that detects an event occurring on the vehicle; a step of determining parking tendency that determines a tendency of a parking time at a parking position of the vehicle; and a step of controlling recording function that, when an event is detected at the step of detecting event while the vehicle is parked, controls a parking recording function for storing the video data captured by the image capturing unit, wherein based on a determination result at the step of determining parking tendency, if the parking position of the vehicle is a place where the vehicle is to be parked for a relatively long period of time, the step of controlling recording function performs a first parking recording that causes the image capturing unit to start capturing an image upon detecting an event and that stores captured data of a first period, as event recorded data, and if the parking position of the vehicle is not a place where the vehicle is to be parked for a relatively long period of time, the step of controlling recording function performs a second parking recording that causes the image capturing unit to operate while the vehicle is parked, and upon detecting an event, that stores captured data of a second period before and after, and including a time when the event is detected, as event recorded data.

DETAILED DESCRIPTION

Hereinafter, embodiments of a vehicle recording control device, a vehicle recording device, a vehicle recording control method, and a computer program according to the present disclosure will be described in detail with reference to the accompanying drawings. However, the present disclosure is not limited to the following embodiments.

First Embodiment

Figure 1:
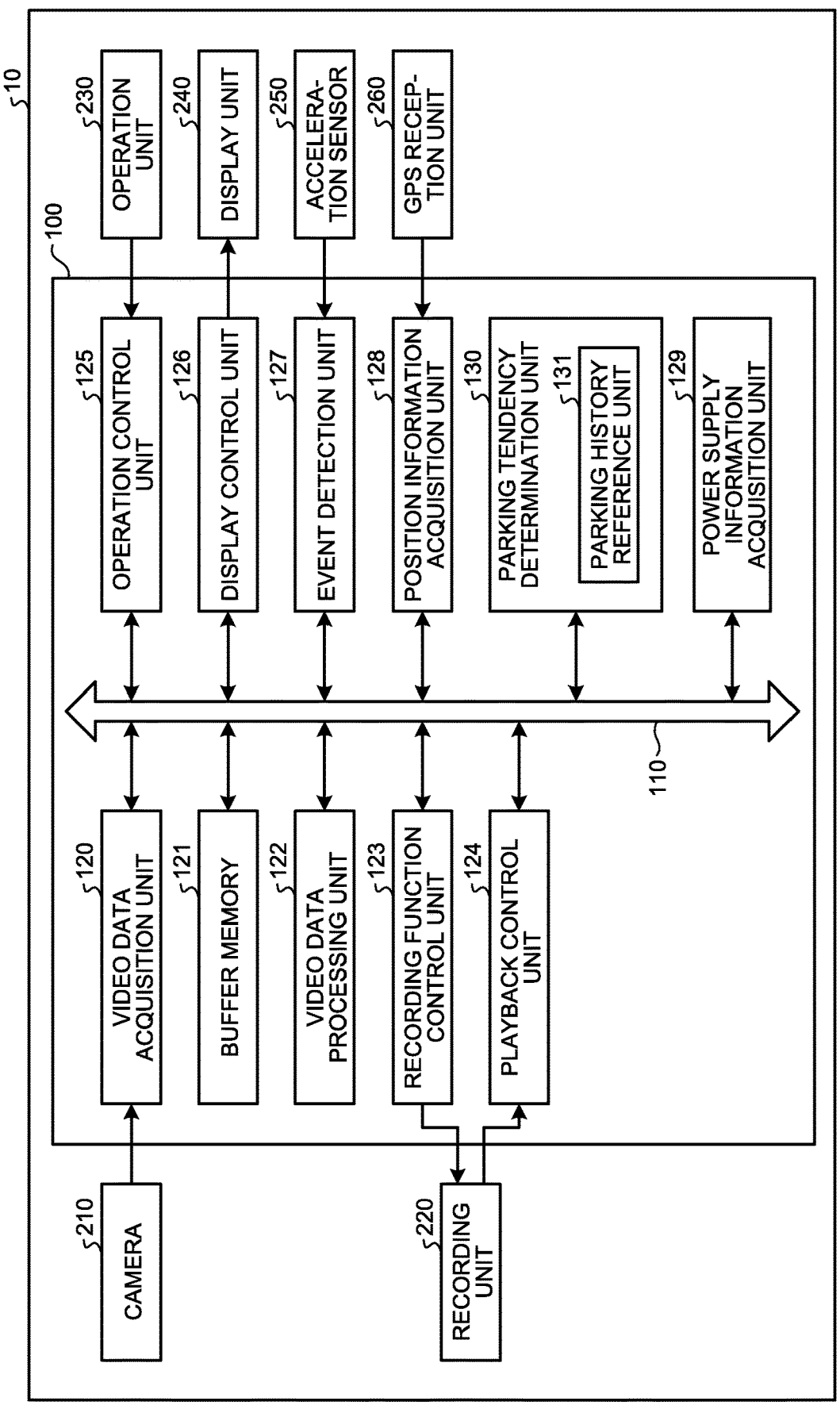
FIG. 1 is a block diagram illustrating a configuration example of a vehicle recording device including a vehicle recording control device according to a first embodiment.

FIG. 1 is a block diagram illustrating a configuration example of a vehicle recording device including a vehicle recording control device according to a first embodiment. A vehicle recording device 10 activates a different parking recording function between when the parking position of a vehicle is a place where the vehicle is to be parked for a relatively long period of time, and when the parking position of a vehicle is not a place where the vehicle is to be parked for a relatively long period of time.

The relatively long period of time is a period longer than the period during which a parking recording function for loop recording can be performed by a built-in battery or a battery of the vehicle, while an accessory power supply of the vehicle is turned OFF. When the parking recording function for loop recording is used to perform parking recording while the vehicle is parked for a relatively long period of time, the capacity of the built-in battery may become insufficient, or the capacity of the battery of the vehicle may become insufficient in the middle of recording. Consequently, the vehicle may not be able to run properly. It is preferable that the relatively long period of time is set according to the remaining capacity of the built-in battery or the external battery. For example, the relatively long period of time is an hour or longer.

The vehicle recording device 10 may be mounted on a vehicle, or may be a portable device that can be used in a vehicle. The vehicle recording device 10 includes a camera (image capturing unit) 210, a recording unit 220, an operation unit 230, a display unit 240, an acceleration sensor 250, a global positioning system (GPS) reception unit 260, and a vehicle recording control device 100.

The camera 210 is a camera for capturing images of the surroundings of a vehicle. In the present embodiment, the camera 210 is a camera that can capture images of the whole sky of 360 degrees. However, it is not limited thereto, and the camera 210 may also be a single camera facing a single direction, or a group of cameras that capture images of various directions. For example, the camera 210 is disposed in front of the vehicle interior of a vehicle. The camera 210 captures video images continuously from when the engine is started to when the engine is stopped, in other words, while the vehicle is operated. In the present embodiment, when the accessory power supply of the vehicle is turned ON, the camera 210 captures video images continuously. In the present embodiment, for example, when the accessory power supply is turned OFF, in other words, while the vehicle is parked, upon detecting an event, the camera 210 can store video images of a predetermined period for about several tens of seconds. The camera 210 outputs the captured video data to a video data acquisition unit 120 in the vehicle recording control device 100. For example, the video data is a moving image configured by images of 30 frames per second.

The recording unit 220 is used for temporarily storing data in the vehicle recording device 10. For example, the recording unit 220 is a recording unit such as a semiconductor memory element including a random access memory (RAM), a flash memory, and the like, or a memory card. Alternatively, the recording unit 220 may also be an external recording unit wirelessly connected via a communication device, which is not illustrated. The recording unit 220 records loop recorded video data or event recorded data, on the basis of a control signal output from a recording function control unit 123 in the vehicle recording control device 100.

The operation unit 230 accepts various operations on the vehicle recording device 10. For example, the operation unit 230 accepts an operation for manually storing the captured video data in the recording unit 220. For example, the operation unit 230 accepts an operation for playing back the loop recorded video data or the event recorded data having been recorded in the recording unit 220. For example, the operation unit 230 accepts an operation for eliminating the event recorded data having been recorded in the recording unit 220. For example, the operation unit 230 accepts an operation for finishing loop recording. The operation unit 230 outputs the operation information to an operation control unit 125 in the vehicle recording control device 100.

For example, the display unit 240 is a display device dedicated to the vehicle recording device 10, a display device used in common with another system including a navigation system, or the like. The display unit 240 may also be integrally formed with the camera 210. For example, the display unit 240 is a display including a liquid crystal display (LCD), an organic electro-luminescence (EL) display, or the like. In the present embodiment, the display unit 240 is disposed on a dashboard, an instrumental panel, a center console, or the like in front of the driver of the vehicle. On the basis of a video signal output from a display control unit 126 in the vehicle recording control device 100, the display unit 240 displays video images. The display unit 240 displays the video images captured by the camera 210, or the video images recorded in the recording unit 220.

The acceleration sensor 250 is a sensor for detecting the acceleration of the vehicle. In the present embodiment, the acceleration sensor 250 detects acceleration as a value indicating a change in speed of the vehicle. The acceleration sensor 250 outputs a detection result to an event detection unit 127 in the vehicle recording control device 100. For example, the acceleration sensor 250 is a sensor for detecting the acceleration in the three-axial directions. The three-axial directions include the front-rear direction, the left-right direction, and the up-down direction of the vehicle.

The GPS reception unit 260 receives radio waves from a GPS satellite, which is not illustrated. The GPS reception unit 260 outputs the received radio wave signal to a position information acquisition unit 128 in the vehicle recording control device 100.

For example, the vehicle recording control device 100 is an arithmetic processing device (control device) configured of a central processing unit (CPU) and the like. The vehicle recording control device 100 loads a stored computer program into a memory, and executes a command included in the computer program. The vehicle recording control device 100 includes an internal memory, which is not illustrated, and the internal memory is used for temporarily storing data in the vehicle recording control device 100, and the like. The vehicle recording control device 100 includes the video data acquisition unit 120, a buffer memory 121, a video data processing unit 122, the recording function control unit 123, a playback control unit 124, the operation control unit 125, the display control unit 126, the event detection unit 127, the position information acquisition unit 128, a power supply information acquisition unit 129, and a parking tendency determination unit 130 connected to a bus 110.

The video data acquisition unit 120 acquires video data obtained by capturing images of the surroundings of the vehicle. More specifically, the video data acquisition unit 120 acquires the video data output from the camera 210.

The buffer memory 121 is an internal memory in the vehicle recording control device 100, and is a memory for temporarily recording video data of a certain period acquired by the video data acquisition unit 120, while the video data is updated.

For example, the video data processing unit 122 converts the video data temporarily stored in the buffer memory 121 to any file format such as MP4 format encoded with any codec including H.264, moving picture experts group (MPEG-4), and the like. The video data processing unit 122 generates video data that is a file of a certain period, from the video data temporarily stored in the buffer memory 121. More specifically, the video data processing unit 122 generates video data of 60 seconds as a file, from the video data temporarily stored in the buffer memory 121, in the recording order. The video data processing unit 122 outputs the generated video data to the recording function control unit 123. Moreover, the video data processing unit 122 outputs the generated video data to the display control unit 126. For example, the period of the video data generated as a file is 60 seconds. However, it is not limited thereto. The video data in this example may also be data including voice in addition to the video images captured by the camera 210.

The recording function control unit 123 controls to cause the recording unit 220 to record the video data converted into a file by the video data processing unit 122. During a period when loop recording is performed, such as when the accessory power supply of the vehicle is turned ON, the recording function control unit 123 records the video data converted into a file by the video data processing unit 122 in the recording unit 220, as rewritable video data. More specifically, during a period when loop recording is performed, such as when the accessory power supply is turned ON, the recording function control unit 123 keeps recording the video data generated by the video data processing unit 122 in the recording unit 220. Then, when the capacity of the recording unit 220 becomes full, the recording function control unit 123 overwrites the oldest video data with new video data, and records the new video data.

Moreover, when the event detection unit 127 detects an event, the recording function control unit 123 stores the video data of a predetermined period in the video data generated by the video data processing unit 122, in the recording unit 220, as the event recorded data prohibited from being overwritten.

For example, in the event recorded data to be stored in the recording unit 220 by the recording function control unit 123, when the image capturing is started after the event is detected, video data of a first period of about ten seconds and more to 60 seconds and less after the event is detected and the image capturing is started, is stored as the event recorded data. In the event recorded data to be stored in the recording unit 220 by the recording function control unit 123, during a period when loop recording is turned ON, video data of a second period of about ten seconds and more to 60 seconds and less before and after the time when the event is detected, is stored as the event recorded data.

When the accessory power supply of the vehicle is turned OFF, in other words, while the vehicle is parked, the recording function control unit 123 controls the parking recording function, according to the tendency of the parking time at the parking position of the vehicle. In other words, when a signal indicating that the accessory power supply of the vehicle is turned OFF is acquired from the power supply information acquisition unit 129, the recording function control unit 123 determines that the vehicle is parked. The parking recording function is a function for storing the video data captured by the camera 210, upon detecting an event while the vehicle is parked.

More specifically, when the parking position of the vehicle is a place where the vehicle is to be parked for a relatively long period of time, the recording function control unit 123 performs a first parking recording that causes the camera 210 to start capturing images upon detecting an event, and that stores the captured data of the first period after the event is detected. When the parking position of the vehicle is not a place where the vehicle is to be parked for a relatively long period of time, the recording function control unit 123 performs a second parking recording that turns ON loop recording and causes the camera 210 to operate while the vehicle is parked, and upon detecting an event, that stores the captured data of the second period before and after, and including the time when the event is detected.

In the present embodiment, the recording function control unit 123 determines whether the parking position of the vehicle is a place where the vehicle is to be parked for a relatively long period of time, on the basis of parking history information referred to by a parking history reference unit 131 of the parking tendency determination unit 130. For example, when the average parking time at the parking position of the vehicle is an hour or longer, the recording function control unit 123 determines that the place is where the vehicle is to be parked for a relatively long period of time, on the basis of the parking history information. For example, when the average parking time at the parking position of the vehicle is longer than the time the loop recording is prevented from being performed using the built-in battery or the battery of the vehicle, the recording function control unit 123 may determine that the place is where the vehicle is to be parked for a relatively long period of time, on the basis of the parking history information.

On the basis of a control signal for performing a playback operation output from the operation control unit 125, the playback control unit 124 controls to playback the loop recorded video data or the event recorded data having been recorded in the recording unit 220.

The operation control unit 125 acquires operation information for operation received by the operation unit 230. For example, the operation control unit 125 acquires storage operation information indicating an operation for manually storing video data, playback operation information indicating a playback operation, or erase operation information indicating an operation for erasing video data, and outputs a control signal. For example, the operation control unit 125 acquires finishing operation information indicating an operation for finishing loop recording, and outputs a control signal.

The display control unit 126 controls the display of video data on the display unit 240. The display control unit 126 outputs a video signal for causing the display unit 240 to output video data. More specifically, the display control unit 126 outputs a video signal for displaying the video images captured by the camera 210, or playing back the loop recorded video data or the event recorded data having been recorded in the recording unit 220.

On the basis of the detection result from the acceleration sensor 250, the event detection unit 127 detects an event occurring on the vehicle. More specifically, when an acceleration equal to or higher than a threshold is detected in the acceleration detected by the acceleration sensor 250, the event detection unit 127 detects the acceleration as an event. The threshold for detecting an event when parking recording is taking place may be set smaller than a threshold used for detecting an event while the vehicle is traveling. For example, when the threshold of acceleration for detecting an event while the vehicle is traveling is about 1 G, the threshold of acceleration for detecting an event when parking recording is taking place may be about 0.3 G.

The position information acquisition unit 128 calculates the current position information of the vehicle, on the basis of radio waves received by the GPS reception unit 260, using a known method.

The power supply information acquisition unit 129 acquires information whether the accessory power supply of the vehicle is turned ON or turned OFF, on the basis of electric power supplied to the vehicle recording device 10. The power supply information acquisition unit 129 outputs the acquisition result to the recording function control unit 123.

The parking tendency determination unit 130 determines the tendency of the parking time when the vehicle is parked at the parking position. The parking tendency determination unit 130 includes the parking history reference unit 131.

The parking history reference unit 131 refers to parking history information indicating the parking history including the parking position and the parking time of the vehicle. In the present embodiment, the parking history reference unit 131 acquires the parking history information including the parking position and the parking time of the vehicle from a navigation system. More specifically, the parking position is the position information of the vehicle when the vehicle is stopped, acquired by the navigation system. Moreover, the parking time is time from when the vehicle is stopped at the parking position to when the vehicle is started. In the parking history information, as the parking position of the vehicle, the name of the parking lot corresponding to the position where the vehicle is parked may also be used as the parking history information.

Figure 2:
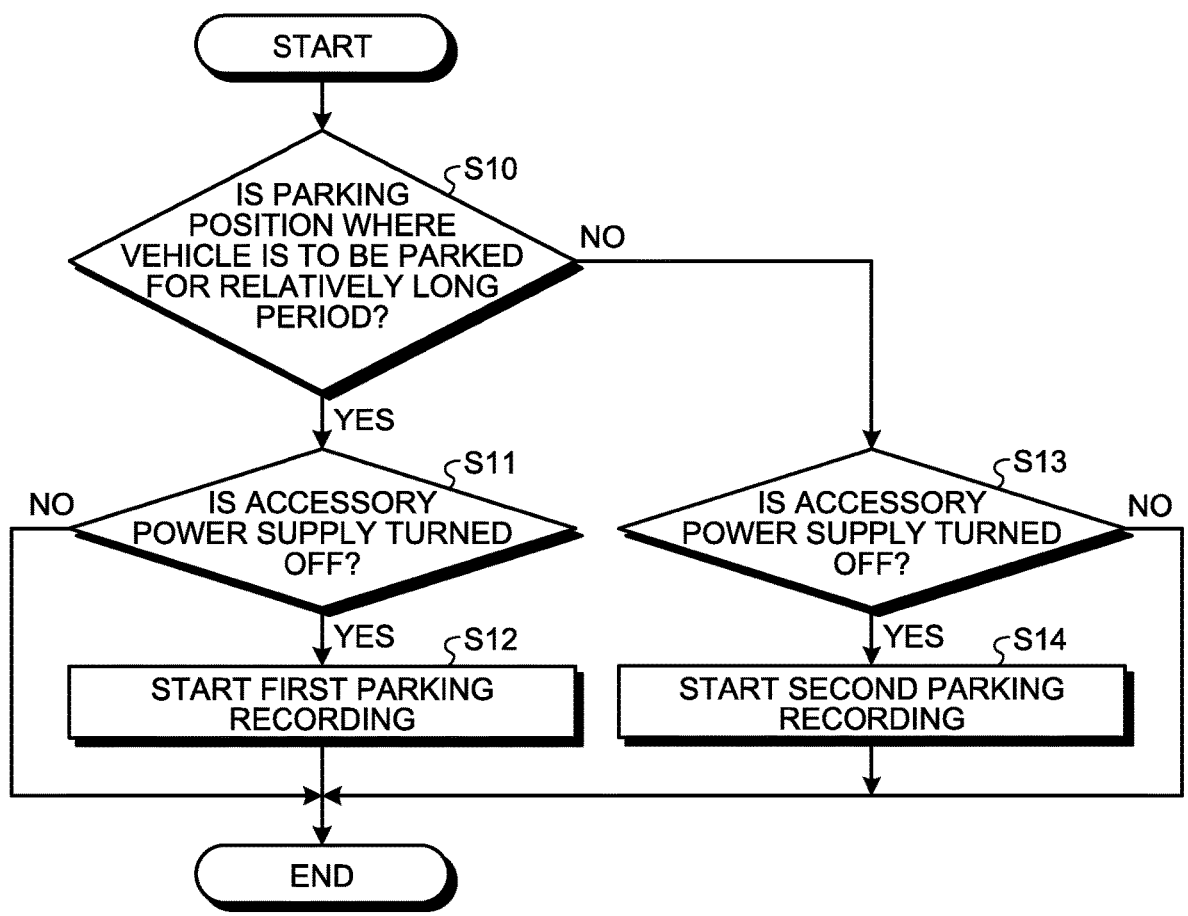
FIG. 2 is a flowchart illustrating a flow of a process performed by the vehicle recording control device according to the first embodiment.

Next, with reference to FIG. 2, a flow of a process performed by the vehicle recording control device 100 will be described. FIG. 2 is a flowchart illustrating a flow of a process performed by the vehicle recording control device according to the first embodiment. While the vehicle is being operated, the vehicle recording control device 100 causes the position information acquisition unit 128 to acquire the current position information of the vehicle. The vehicle is being operated, when the vehicle is not parked, such as when power is supplied to the vehicle recording device 10 from the accessory power supply of the vehicle. When the vehicle is stopped, the vehicle recording control device 100 executes the process of the flowchart illustrated in FIG. 2. For example, the vehicle is stopped, when the shift position is set to "parking", when the side brake is operated, when the speed becomes zero for five seconds or more, when the engine is stopped, or the like. Alternatively, it is also possible to determine that the vehicle is stopped, by any trigger such as user's operation.

The vehicle recording control device 100 determines whether a position where the vehicle is parked is a parking position where the vehicle is to be parked for a relatively long period of time (step S10). More specifically, the vehicle recording control device 100 causes the parking tendency determination unit 130 to determine whether the parking position of the vehicle is a place where the vehicle is to be parked for a relatively long period of time, on the basis of the parking history information of the vehicle referred to by the parking history reference unit 131. In other words, the vehicle recording control device 100 determines whether the parking lot at which the vehicle is parked, is a parking lot to park the vehicle for the purpose of parking the vehicle for a relatively long period of time. When the parking tendency determination unit 130 determines that the parking position of the vehicle is a place where the vehicle is to be parked for a relatively long period of time (Yes at step S10), the vehicle recording control device 100 proceeds to step S11. When the parking tendency determination unit 130 determines that the parking position of the vehicle is not a place where the vehicle is to be parked for a relatively long period of time (No at step S10), the vehicle recording control device 100 proceeds to step S13.

When it is determined that the parking position of the vehicle is a place where the vehicle is to be parked for a relatively long period of time (Yes at step S10), the vehicle recording control device 100 determines whether the accessory power supply of the vehicle is turned OFF (step S11). When it is determined that the accessory power supply is turned OFF (Yes at step S11), the vehicle recording control device 100 proceeds to step S12. When it is determined that the accessory power supply is not turned OFF (No at step S11), the vehicle recording control device 100 finishes the present process.

When it is detected that the accessory power supply of the vehicle is turned OFF (Yes at step S11), the vehicle recording control device 100 causes the recording function control unit 123 to start the first parking recording (step S12), and finishes the present process.

When it is determined that the parking position of the vehicle is not a place where the vehicle is to be parked for a relatively long period of time (No at step S10), the vehicle recording control device 100 determines whether the accessory power supply of the vehicle is turned OFF (step S13). When it is determined that the accessory power supply is turned OFF (Yes at step S13), the vehicle recording control device 100 proceeds to step S14. When it is determined that the accessory power supply is not turned OFF (No at step S13), the vehicle recording control device 100 finishes the present process.

When it is detected that the accessory power supply of the vehicle is turned OFF (Yes at step S13), the vehicle recording control device 100 causes the recording function control unit 123 to start the second parking recording (step S14), and finishes the present process.

In the process illustrated in FIG. 2, when the process illustrated in FIG. 2 is finished before the parking recording function reaches the first state or the second state, the present process is performed again when the vehicle is stopped the next time. In the process illustrated in FIG. 2, when the process illustrated in FIG. 2 is finished after the first state or the second state of the parking recording function is started, the parking recording function at step S12 or step S14 is performed until the parking is completed.

Figure 3:
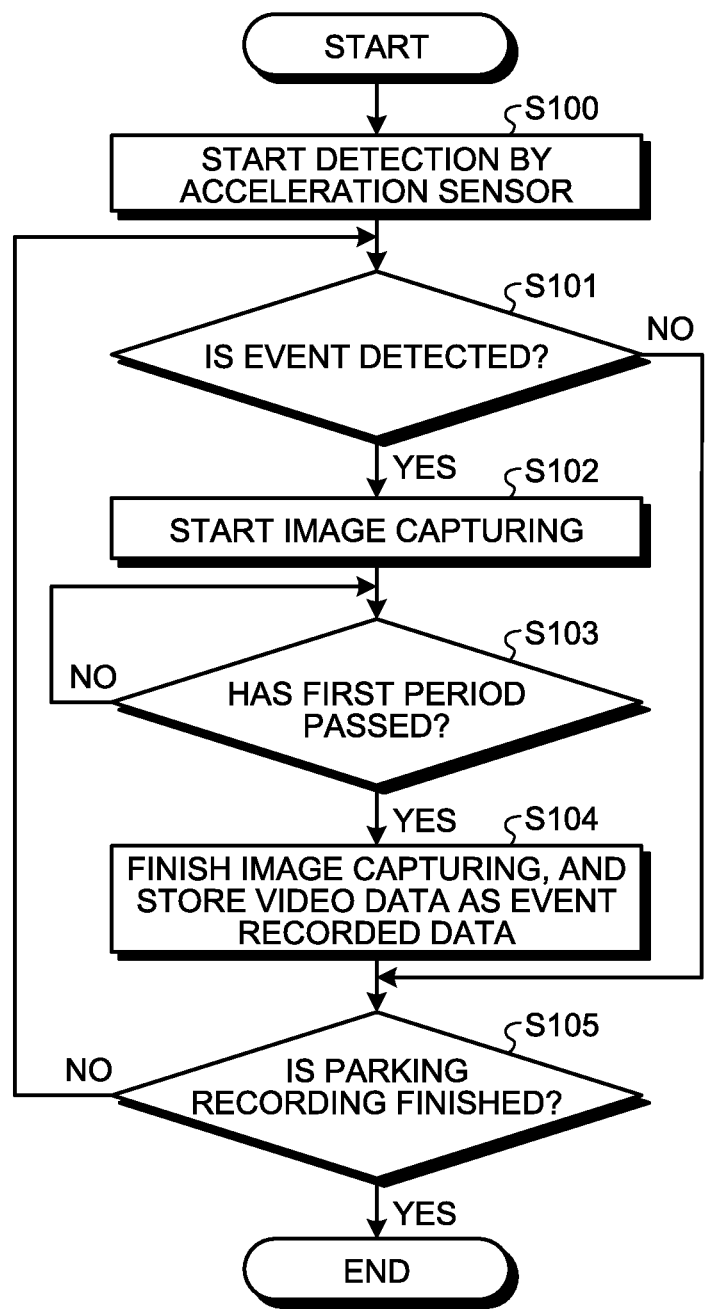
FIG. 3 is a flowchart illustrating a flow of a process performed by the vehicle recording control device according to the first embodiment.

Next, with reference to FIG. 3, an example of a flow of the process at step S12 in the flowchart illustrated in FIG. 2 will be described in more detail. FIG. 3 is a flowchart illustrating a flow of a process performed by the vehicle recording control device according to the first embodiment. The process illustrated in FIG. 3 is a diagram for explaining a process of the first parking recording in the parking recording function.

The process in FIG. 3 is started, when the process of the first parking recording is started. The vehicle recording control device 100 causes the recording function control unit 123 to start detecting an event on the basis of the output from the acceleration sensor 250 (step S100), and proceeds to step S101.

The vehicle recording control device 100 causes the event detection unit 127 to determine whether an event is detected, on the basis of the detection result from the acceleration sensor 250 (step S101). More specifically, when the event detection unit 127 detects acceleration of equal to or more than a threshold, the vehicle recording control device 100 determines that the event is detected (Yes at step S101), and proceeds to step S102. When the event detection unit 127 does not detect acceleration of equal to or more than a threshold, the vehicle recording control device 100 determines that the event is not detected (No at step S101), and proceeds to step S105.

The vehicle recording control device 100 causes the recording function control unit 123 to cause the camera 210 to start capturing images (step S102), and proceeds to step S103.

The vehicle recording control device 100 determines whether the first period has passed (step S103). When it is determined that the first period has passed (Yes at step S103), the vehicle recording control device 100 proceeds to step S104. When it is determined that the first period has not passed (No at step S103), the vehicle recording control device 100 performs the process at step S103 again.

The vehicle recording control device 100 causes the recording function control unit 123 to store the captured video data in the recording unit 220, as the event recorded data (step S104), and proceeds to step S105. The event recorded data stored at step S104 is video data of a period from when the image capturing is started at step S102, to when the image capturing is finished at step S104, including when it is determined that the first period has passed at step S103.

The vehicle recording control device 100 determines whether the parking recording function is finished (step S105). For example, it is determined that the parking recording function is finished, when the accessory power supply is turned ON, when the parking recording function is stopped by the operation of the operation unit 230, and the like.

At step S105, when it is determined that the parking recording function is finished (Yes at step S105), the vehicle recording control device 100 finishes the present process. When it is determined that the parking recording function is not yet finished (No at step S105), the vehicle recording control device 100 returns the process to step S101.

Figure 4:
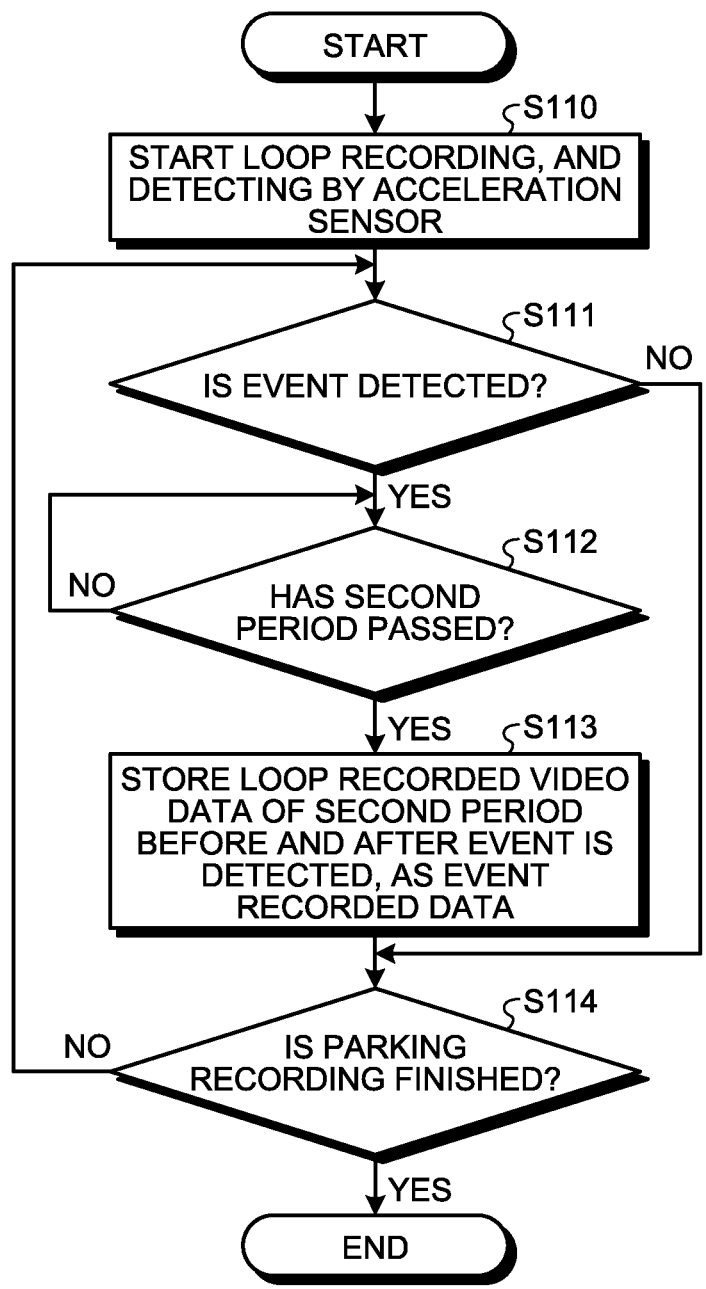
FIG. 4 is a flowchart illustrating a flow of a process performed by the vehicle recording control device according to the first embodiment.

Next, with reference to FIG. 4, another example of a flow of the process at step S14 in the flowchart illustrated in FIG. 2 will be described in more detail. FIG. 4 is a flowchart illustrating a flow of a process performed by the vehicle recording control device according to the first embodiment. The process illustrated in FIG. 4 is a diagram for explaining a process of the second parking recording in the parking recording function. The processes at step S111 and step S112 in FIG. 4 are the same as the processes at step S101 and step S103 in FIG. 3.

The process in FIG. 4 is started when the process of the second parking recording is started. The vehicle recording control device 100 causes the recording function control unit 123 to start loop recording, starts detecting an event on the basis of the output from the acceleration sensor 250 (step S110), and proceeds to step S111.

The vehicle recording control device 100 causes the recording function control unit 123 to store video data of the second period before and after, and including the time when the event is detected, as the event recorded data (step S113). More specifically, the vehicle recording control device 100 causes the video data processing unit 122 to generate video data including the second period before and after, and including the time when the event is detected, as the event recorded data. When it is determined that a predetermined time has passed at step S112, the vehicle recording control device 100 causes the recording function control unit 123 to store the event recorded data including the time when the event is detected that is generated by the video data processing unit 122 in the recording unit 220, and proceeds to step S114.

In this manner, when the parking position of the vehicle is a place where the vehicle is to be parked for a relatively long period of time, the first parking recording that causes the camera 210 to start capturing images upon detecting an event, and that stores the captured data of the first period is performed. Moreover, when the parking position of the vehicle is not a place where the vehicle is to be parked for a relatively long period of time, the second parking recording that causes the camera 210 to operate while the vehicle is parked, and upon detecting an event, that stores the captured data of the second period before and after, and including the time when the event is detected is performed.

As described above, in the present embodiment, the first parking recording is performed when the parking position of the vehicle is a place where the vehicle is to be parked for a relatively long period of time. Consequently, when the vehicle is parked at the parking position where the vehicle is to be parked for a relatively long period of time, while the vehicle is parked, an operation for detecting an event is only performed. Thus, compared to when the second parking recording is performed, it is possible to reduce power consumption, and operate the parking recording function for a long period of time.

Moreover, when the parking position of the vehicle is not a place where the vehicle is to be parked for a relatively long period of time, the second parking recording is performed. Consequently, when the vehicle is parked at the parking position where the vehicle is not to be parked for a relatively long period of time, and when an event has occurred, the video images before and after the occurrence of the event can be stored as the event recorded data.

In this manner, with the present embodiment, it is possible to perform suitable parking recording according to the tendency of the parking time at the parking position of the vehicle.

For example, the parking position where the vehicle is to be parked for a relatively long period of time includes a parking lot of a large shopping mall, a parking lot at work, a parking lot of home, and the like. For example, the parking lot where the vehicle is not to be parked for a long period of time includes a parking lot of a small supermarket or a convenience store, and the like.

Second Embodiment

Figure 5:
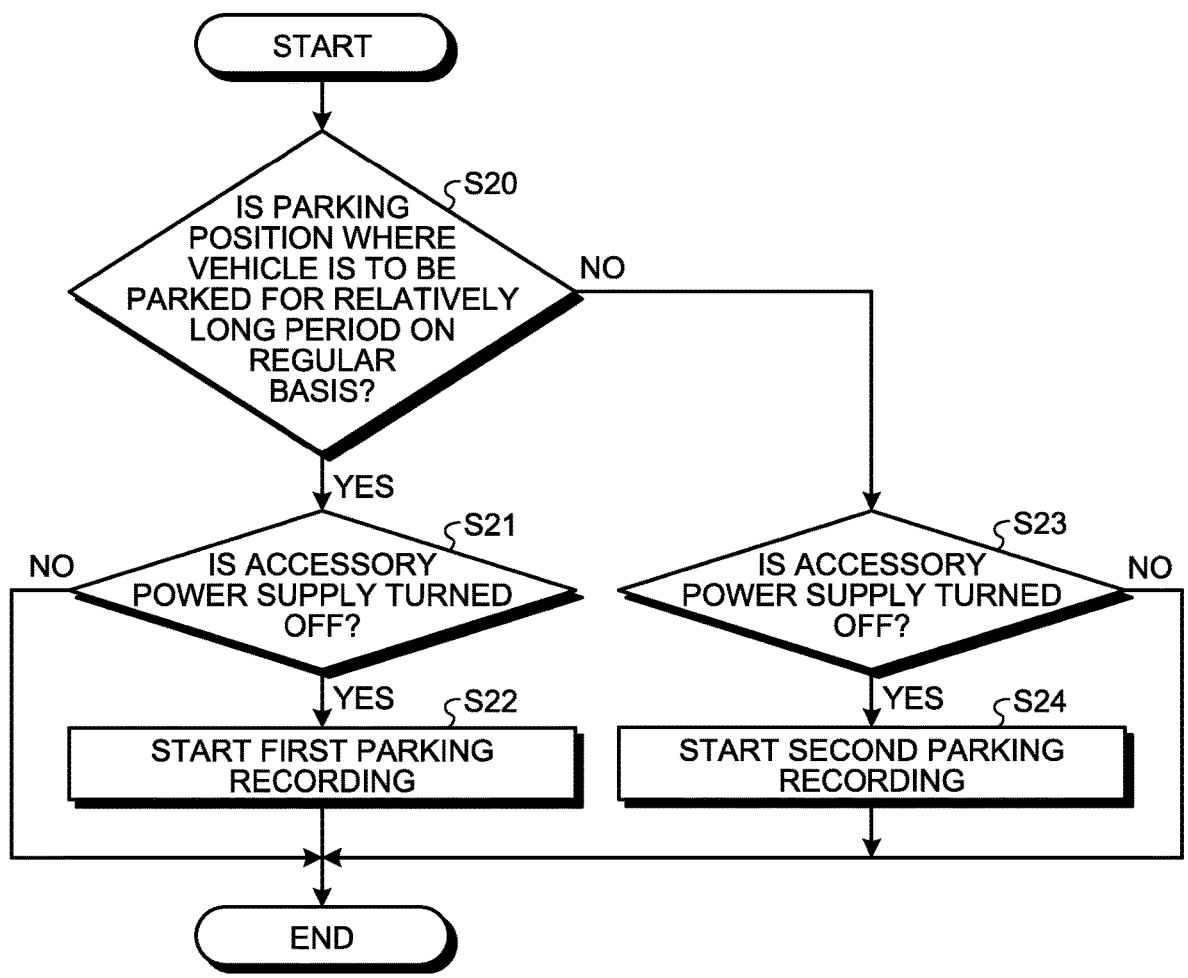
FIG. 5 is a flowchart illustrating a flow of a process performed by a vehicle recording control device according to a second embodiment.

With reference to FIG. 5, the vehicle recording device 10 according to the present embodiment will be described. FIG. 5 is a flowchart illustrating a flow of a process performed by a vehicle recording control device according to a second embodiment. The basic configuration of the vehicle recording device 10 is the same as that of the vehicle recording device 10 in the first embodiment. In the following explanation, the same reference numerals or the corresponding reference numerals are applied to the same components as those in the vehicle recording device 10, and the detailed description thereof will be omitted. The vehicle recording device 10 is different from that in the first embodiment in that the processes performed by the parking history reference unit 131 and the recording function control unit 123 are different.

The parking history reference unit 131 refers to the parking history information to determine whether the parking position of the vehicle is a parking position where the vehicle is to be parked for a relatively long period of time on a regular basis. For example, the parking history reference unit 131 may refer to the parking history information corresponding to time information depending on the day of the week, the date and time, the time zone, and the like.

When it is determined that the parking position of the vehicle is a place where the vehicle is to be parked for a relatively long period of time on a regular basis, on the basis of the parking history information referred to by the parking history reference unit 131, the recording function control unit 123 performs the first parking recording that causes the camera 210 to start capturing images upon detecting an event, and that stores the captured data of the first period.

For example, the parking position of the vehicle is a place where the vehicle is to be parked for a relatively long period of time on a regular basis, when the parking position of the vehicle is at a parking lot of home, a parking lot at work, or a parking lot of a facility repeatedly used by the user. Consequently, it is assumed that the surrounding state of the vehicle can still be recognized by the captured data of the first period after the event is detected not including the time when the event is detected.

Moreover, the recording function control unit 123 may also determine that the parking position of the vehicle is a place where the vehicle is to be parked for a relatively long period of time on a regular basis, on the basis of the parking history information that is referred to by the parking history reference unit 131, and that corresponds to the time information depending on the day of the week, the date and time, the time zone, and the like. For example, the parking position where the vehicle is to be parked for a relatively long period of time depending on the day of the week, is a parking lot at work used from Mondays to Fridays, and the like. For example, the parking position where the vehicle is to be parked for a relatively long period of time depending on the date and time is a parking lot where the user has reserved to park the vehicle for a relatively long period of time in advance, and the like. For example, the parking position where the vehicle is to be parked for a relatively long period of time depending on the time zone is when the user parks the vehicle in the parking lot at work in the morning, when the user parks the vehicle in the parking lot of home in the evening, and the like. The parking history reference unit 131 may also determine whether the parking position of the vehicle is a parking position where the vehicle is to be parked for a relatively long period of time on a regular basis, depending on the conditions such as season and weather.

Next, with reference to FIG. 5, a flow of a process performed by the vehicle recording control device 100 will be described. The processes from step S21 to step S24 are the same as the processes from step S11 to step S14 in the flowchart illustrated in FIG. 2.

The vehicle recording control device 100 determines whether the parking position of the vehicle is a parking position where the vehicle is to be parked for a relatively long period of time on a regular basis (step S20). More specifically, when the recording function control unit 123 determines that the parking position of the vehicle is a parking position where the vehicle is to be parked for a relatively long period of time on a regular basis (Yes at step S20), on the basis of the parking history information referred to by the parking history reference unit 131, the vehicle recording control device 100 proceeds to step S21. When the recording function control unit 123 determines that the parking position of the vehicle is not a parking position where the vehicle is to be parked for a relatively long period of time on a regular basis (No at step S20), on the basis of the parking history information referred to by the parking history reference unit 131, the vehicle recording control device 100 proceeds to step S23.

In this manner, when the parking position of the vehicle is a place where the vehicle is to be parked for a relatively long period of time on a regular basis, the first parking recording that causes the camera 210 to start capturing images upon detecting an event, and that stores the captured data of the first period is performed.

As described above, in the present embodiment, when the parking position of the vehicle is a place where the vehicle is to be parked for a relatively long period of time on a regular basis, the first parking recording is performed. In this manner, with the present embodiment, it is possible to perform suitable parking recording according to the tendency of the parking time at the parking position of the vehicle, when the vehicle is parked.

Third Embodiment

Figure 6:
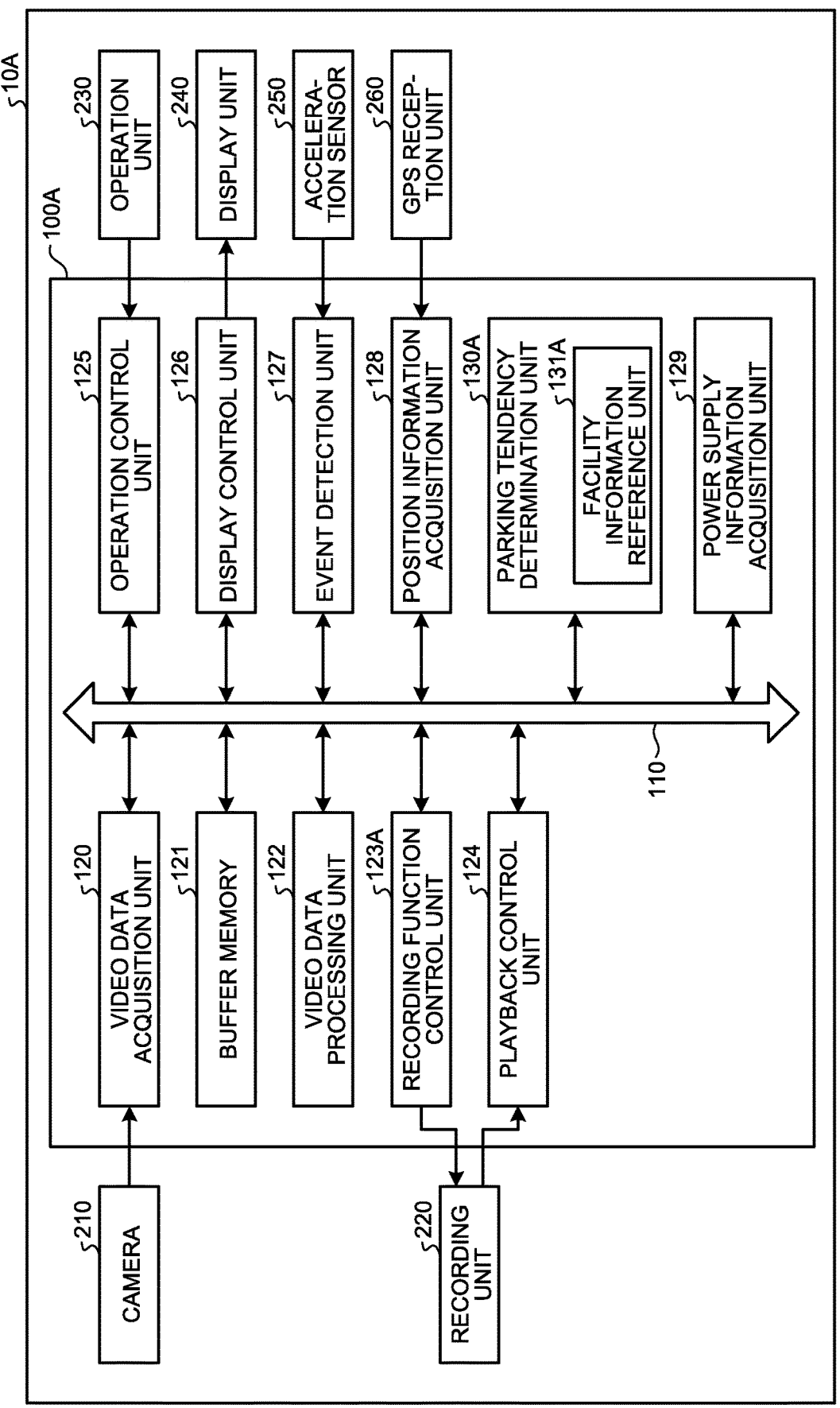
FIG. 6 is a block diagram illustrating a configuration example of a vehicle recording device including a vehicle recording control device according to a third embodiment.
Figure 7:
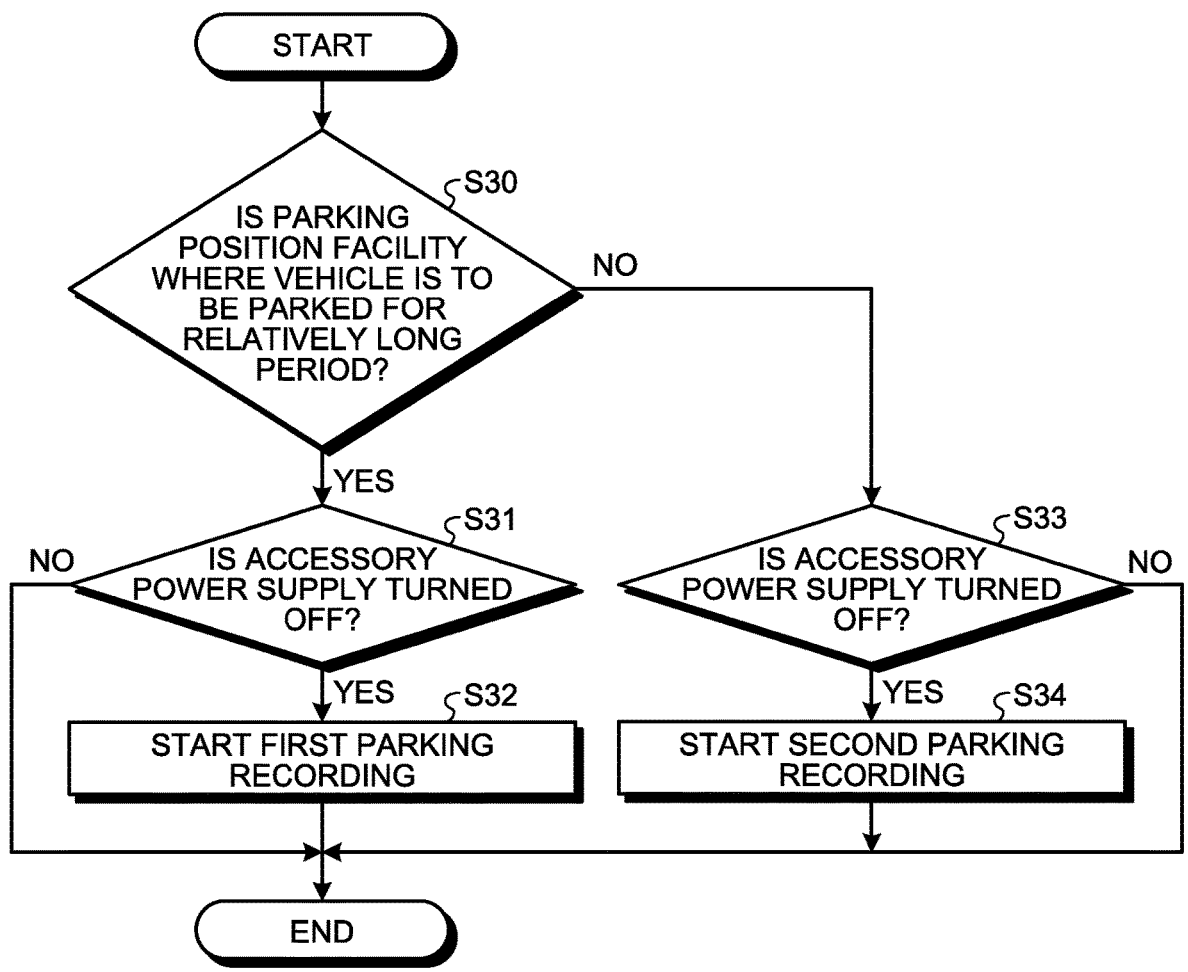
FIG. 7 is a flowchart illustrating a flow of a process performed by the vehicle recording control device according to the third embodiment.

A vehicle recording device 10A according to the present embodiment will be described with reference to FIG. 6 and FIG. 7. FIG. 6 is a block diagram illustrating a configuration example of a vehicle recording device including a vehicle recording control device according to a third embodiment. FIG. 7 is a flowchart illustrating a flow of a process performed by the vehicle recording control device according to the third embodiment. The basic configuration of the vehicle recording device 10A is the same as that of the vehicle recording device 10 in the first embodiment. The vehicle recording device 10A is different from the first embodiment in that a parking tendency determination unit 130A includes a facility information reference unit 131A, and the process performed by a recording function control unit 123A is different.

The facility information reference unit 131A refers to facility information corresponding to the parking position of the vehicle. More specifically, the facility information reference unit 131A refers to the facility information corresponding to the parking position of the vehicle. For example, the facility information reference unit 131A acquires that the parking position of the vehicle is a parking lot of a convenience store. For example, the facility information reference unit 131A acquires that the parking position of the vehicle is a parking lot of a commercial complex such as a shopping mall.

The facility information may also include information that can determine the tendency of the parking time such as the area of the facility and the type of the facility.

On the basis of the facility information referred to by the facility information reference unit 131A, the recording function control unit 123A determines whether the parking position of the vehicle is a facility where the vehicle is to be parked for a relatively long period of time. For example, on the basis of the facility information referred to by the facility information reference unit 131A, the recording function control unit 123A determines that the parking position of the vehicle is a place where the vehicle is to be parked for a relatively long period of time, when the parking position of the vehicle is a large store, a commercial complex, sports facilities, or an airport. For example, on the basis of the facility information referred to by the facility information reference unit 131A, the recording function control unit 123A determines that the parking position of the vehicle is not a place where the vehicle is to be parked for a relatively long period of time, when the parking position of the vehicle is a small shop, public facilities, a station, or a rest house on the highway. For example, on the basis of the facility information referred to by the facility information reference unit 131A, the recording function control unit 123A determines that the parking position of the vehicle is a place where the vehicle is to be parked for a relatively long period of time, when the parking position of the vehicle is a facility with a large area.

Next, with reference to FIG. 7, the flow of a process performed by a vehicle recording control device 100A will be described. The processes from step S31 to step S34 are the same as the processes from step S11 to step S14 in the flowchart illustrated in FIG. 2.

The vehicle recording control device 100A determines whether the parking position of the vehicle is a facility where the vehicle is to be parked for a relatively long period of time (step S30). When it is determined that the parking position of the vehicle is a facility where the vehicle is to be parked for a relatively long period of time (Yes at step S30), the vehicle recording control device 100A proceeds to step S31. When it is determined that the parking position of the vehicle is not a facility where the vehicle is to be parked for a relatively long period of time (No at step S30), the vehicle recording control device 100A proceeds to step S33.

In this manner, when the parking position of the vehicle is a facility where the vehicle is to be parked for a relatively long period of time, the first parking recording that causes the camera 210 to start capturing images upon detecting an event, and that stores the captured data of the first period is performed. Moreover, when the parking position of the vehicle is not a facility where the vehicle is to be parked for a relatively long period of time, the second parking recording that causes the camera 210 to operate while the vehicle is parked, and upon detecting an event, that stores the captured data of the second period before and after, and including the time when the event is detected is performed.

As described above, in the present embodiment, when the parking position of the vehicle is a facility where the vehicle is to be parked for a relatively long period of time, the first parking recording is performed. Consequently, when the vehicle is parked at the parking lot of the facility where the vehicle is to be parked for a relatively long period of time, it is possible to operate the parking recording function for a long period of time.

While the vehicle recording device 10 according to the present disclosure has been described, it is to be understood that various other modifications may be made in addition to the embodiments described above.

The components of the vehicle recording device 10 illustrated in the drawings are functionally conceptual, and need not necessarily be physically configured as illustrated. In other words, the specific modes of the devices are not limited to those illustrated in the drawings, and all or a part thereof may be functionally or physically dispersed or integrated in an optional unit according to the processing load or usage status of each device.

For example, the component of the vehicle recording device 10 may be implemented as a computer program loaded in the memory, as software. In the embodiments described above, the components are described as functional blocks implemented by the cooperation of hardware and software. In other words, these functional blocks can be implemented in various forms by hardware alone, software alone, or a combination thereof.

The components described above include components that can be easily assumed by a person skilled in the art, and components that are substantially the same. Moreover, the components described above can be combined as appropriate. Furthermore, various omissions, replacements, and changes may be made without departing from the spirit of the present disclosure.

The present disclosure has been made in view of the above, and an object of the present disclosure is to properly record video images while a vehicle is parked.

The present disclosure can properly record video images while a vehicle is parked.

What is claimed is:

1. A vehicle recording control device, comprising:
a processor configured to:
acquire video data captured by an image capturing device for capturing an image of a surrounding of a vehicle;
detect an event occurring on the vehicle;
determine whether a a parking time at a parking position of the vehicle is a predetermined period of time or more; and
in response to detecting the event while the vehicle is parked, control a parking recording function for storing the video data captured by the image capturing device, wherein
based on the parking time at the parking position of the vehicle being the predetermined period of time or more,
if the parking position of the vehicle is a place where the vehicle is to be parked for the predetermined period of time or more, perform a first parking recording that causes the image capturing device to start capturing the image upon detecting the event and store captured data of a first period, as event recorded data, and if the parking position of the vehicle is not the place where the vehicle is to be parked for the predetermined period of time or more, perform a second parking recording that causes the image capturing device to operate while the vehicle is parked, and upon detecting the event, store the captured data of a second period before and after, and including a time when the event is detected, as the event recorded data.

2. The vehicle recording control device according to claim 1, wherein the processor is further configure to:
refer to parking history information indicating a parking history including the parking position and a parking time of the vehicle, and
determine whether the parking position of the vehicle is the place where the vehicle is to be parked for the predetermined period of time or more, based on the parking history information.

3. The vehicle recording control device according to claim 2, wherein if the parking position of the vehicle is the place where the vehicle is to be parked for the predetermined period of time or more on a regular basis, the processor is configured to perform the first parking recording, based on the parking history information.

4. The vehicle recording control device according to claim 3, wherein the processor is further configured to:
refer to the parking history information corresponding to the parking time at a position to be parked on the regular basis, and
based on the parking history information corresponding to the time information determine whether the parking position of the vehicle is the place where the vehicle is to be parked for the predetermined period of time or more on the regular basis.

5. The vehicle recording control device according to claim 1, wherein the processor is further configured to:
refer to facility information corresponding to a parking lot that is the parking position of the vehicle; and
based on the facility information corresponding to the parking lot determine whether the parking position of the vehicle is the place where the vehicle is to be parked for the predetermined period of time or more.

6. A vehicle recording device, comprising:
the vehicle recording control device according to claim 1; and
at least one of image capturing device that captures the image of the surrounding of the vehicle, and a recording device that stores the video data.

7. A vehicle recording control method, comprising:
acquiring video data captured by an image capturing device for capturing an image of a surrounding of a vehicle;
detecting event occurring on the vehicle;
determining whether a parking time at a parking position of the vehicle is a predetermined period of time or more; and
in response to detecting the event while the vehicle is parked, controlling a parking recording function for storing the video data captured by the image capturing device, wherein
based on the parking time at the parking position of the vehicle being the predetermined period of time or more,
if the parking position of the vehicle is a place where the vehicle is to be parked for the period of time or more, performing a first parking recording that causes the image capturing device to start capturing the image upon detecting the event and storing captured data of a first period, as event recorded data, and
if the parking position of the vehicle is not the place where the vehicle is to be parked for the predetermined period of time or more, performing a second parking recording that causes the image capturing device to operate while the vehicle is parked, and upon detecting the event, storing the captured data of a second period before and after, and including a time when the event is detected, as the event recorded data.

8. A non-transitory computer readable recording medium storing therein a computer program that causes a computer operating as a vehicle recording control device to execute:
acquiring video data captured by an image capturing device for capturing an image of a surrounding of a vehicle;
detecting an event occurring on the vehicle;
determining whether a parking time at a parking position of the vehicle is a predetermined period of time or more; and
in response to detecting the event while the vehicle is parked, controlling a parking recording function for storing the video data captured by the image capturing device, wherein
based on the parking time at the parking position of the vehicle being the predetermined period of time or more,
if the parking position of the vehicle is a place where the vehicle is to be parked for the predetermined period of time or more, performing a first parking recording that causes the image capturing device to start capturing the image upon detecting the event and storing captured data of a first period, as event recorded data, and
if the parking position of the vehicle is not the place where the vehicle is to be parked for the predetermined period of time or more, performing a second parking recording that causes the image capturing device to operate while the vehicle is parked, and upon detecting the event, storing the captured data of a second period before and after, and including a time when the event is detected, as the event recorded data.

* * * * *